Jan. 24, 1956   S. BIRKLAND   2,732,315
METHOD OF AND APPARATUS FOR TREATING PREDETERMINED
AREAS OF DISC-LIKE ARTICLES
Filed June 2, 1954   6 Sheets-Sheet 3

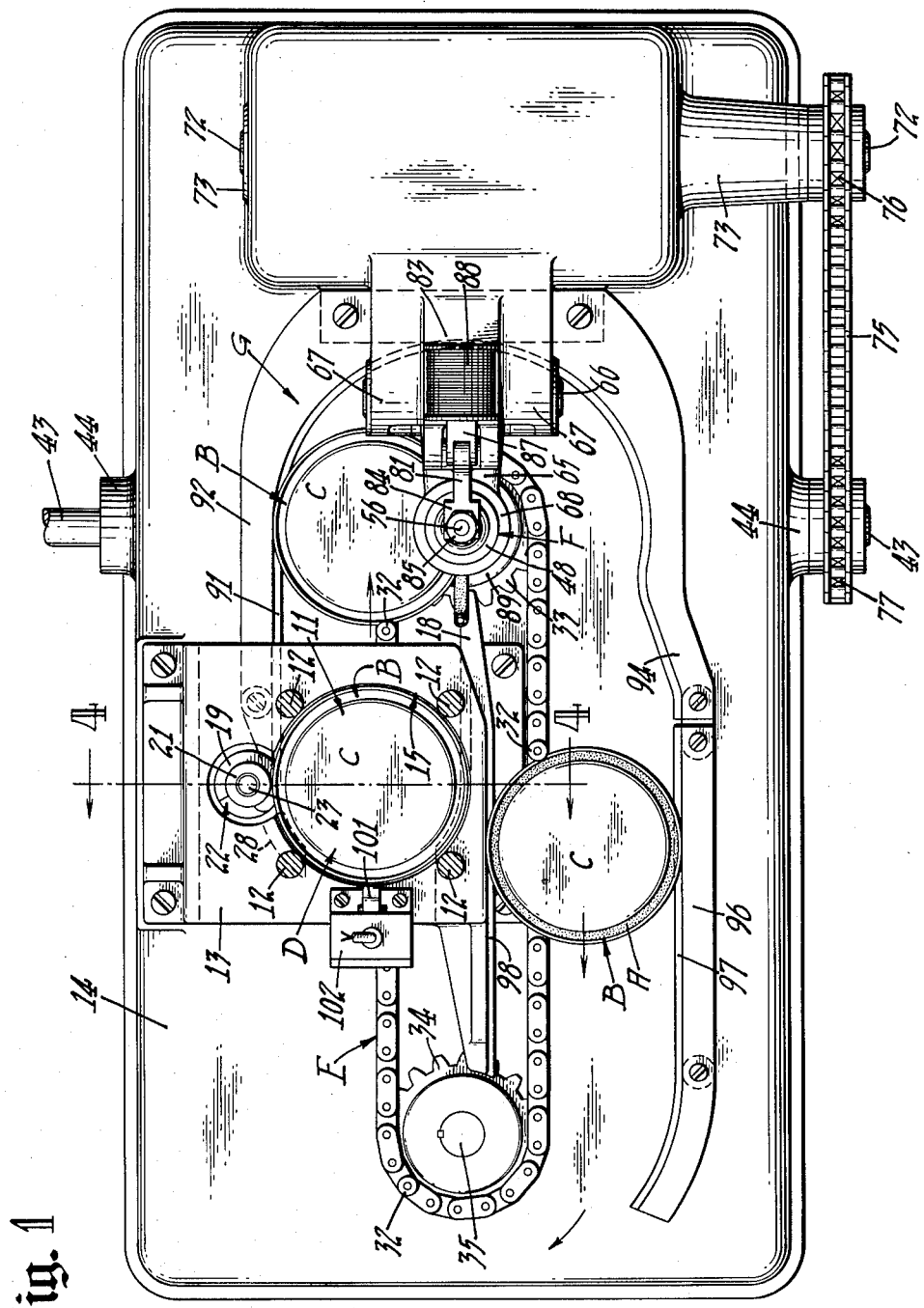

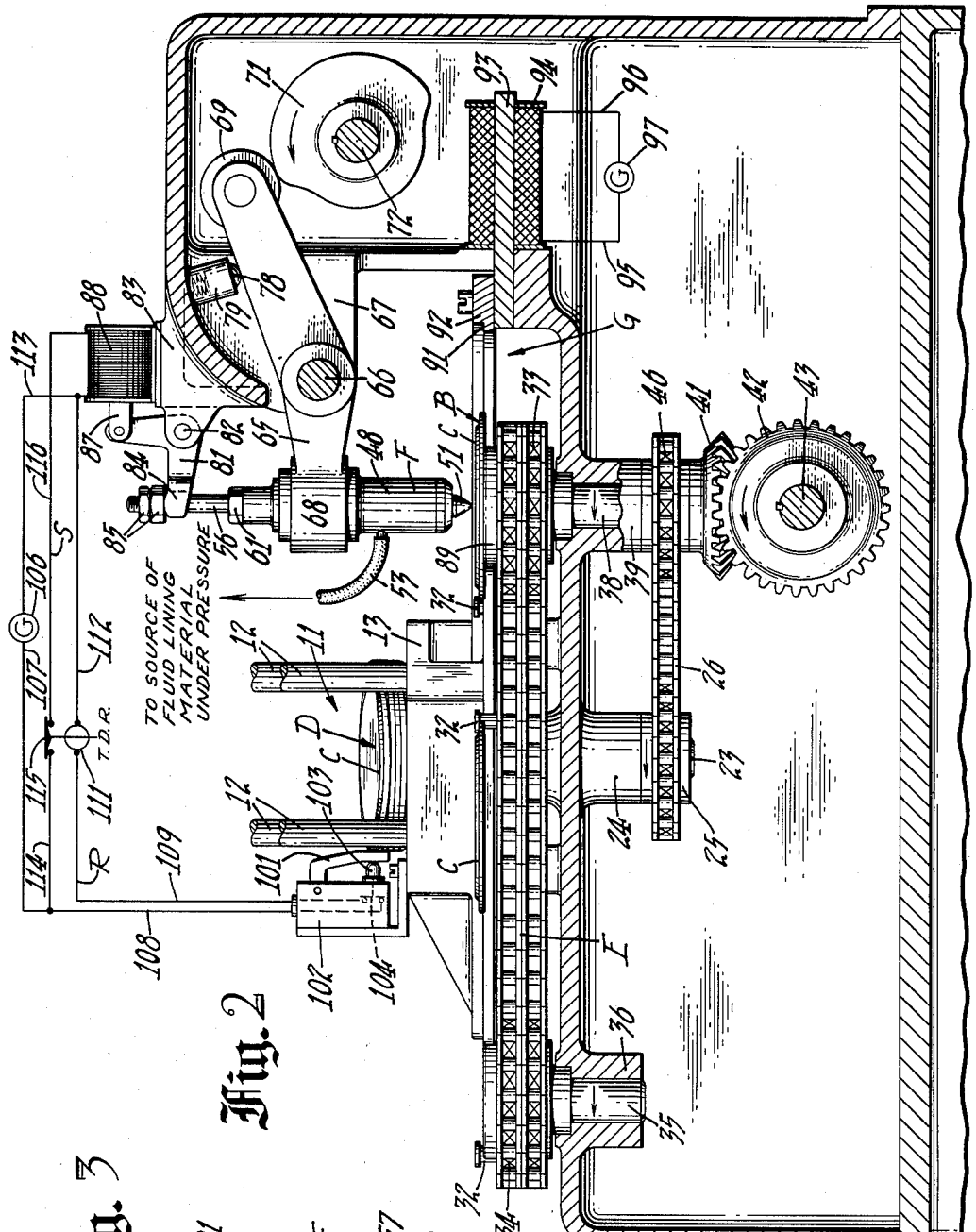

INVENTOR.
STELLAN BIRKLAND
BY Charles H. Erne
Ivan D. Thornburgh
ATTORNEYS

Jan. 24, 1956  S. BIRKLAND  2,732,315
METHOD OF AND APPARATUS FOR TREATING PREDETERMINED
AREAS OF DISC-LIKE ARTICLES
Filed June 2, 1954  6 Sheets-Sheet 4

INVENTOR.
STELLAN BIRKLAND
BY
ATTORNEYS

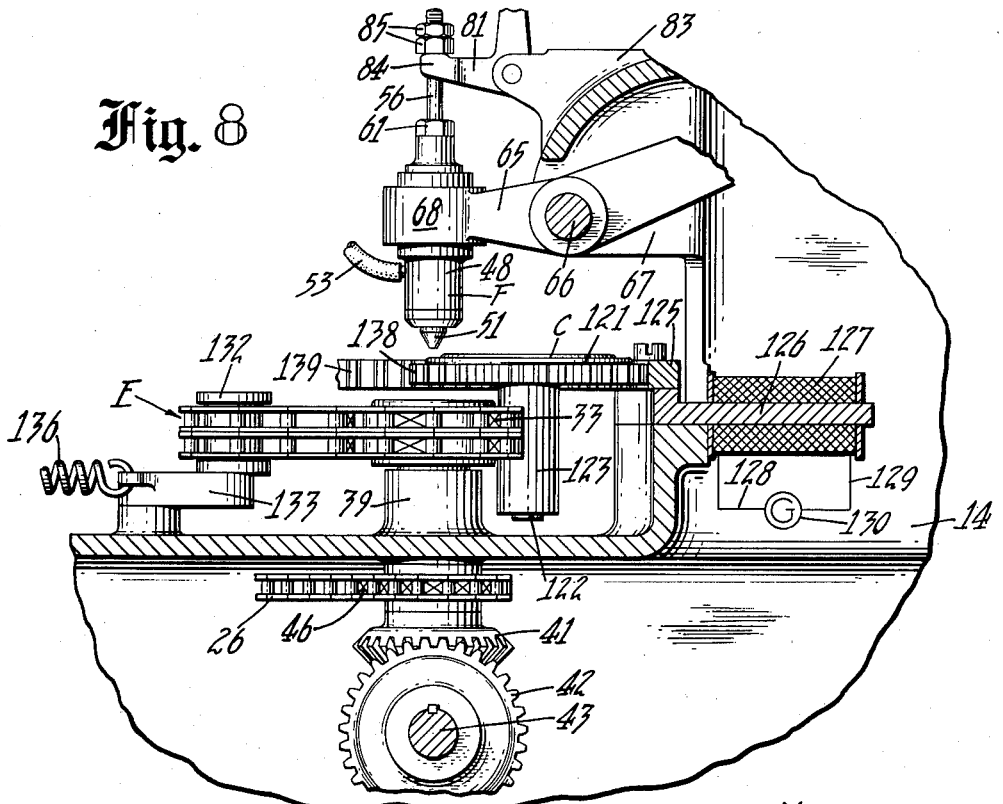
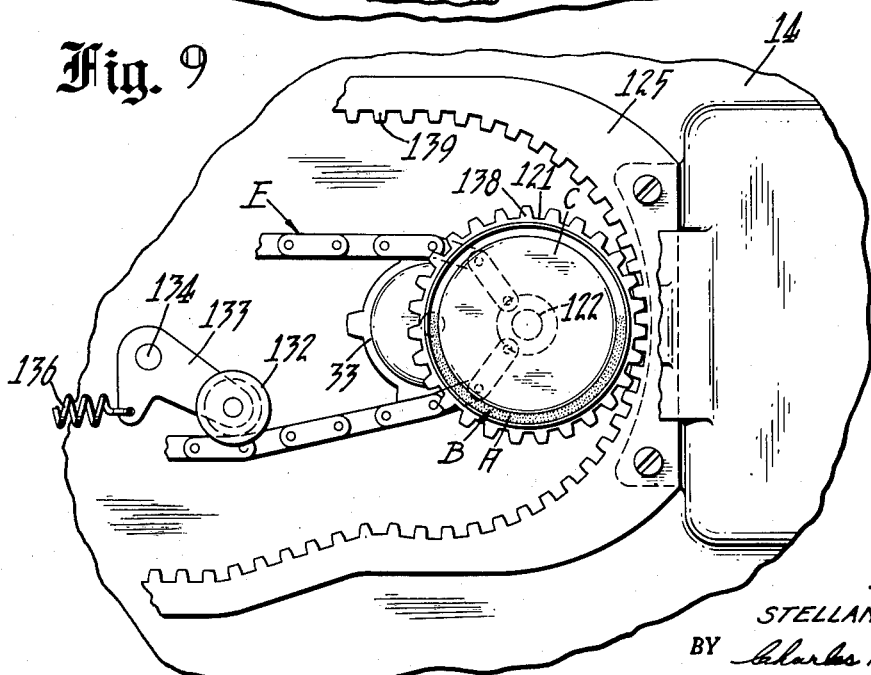

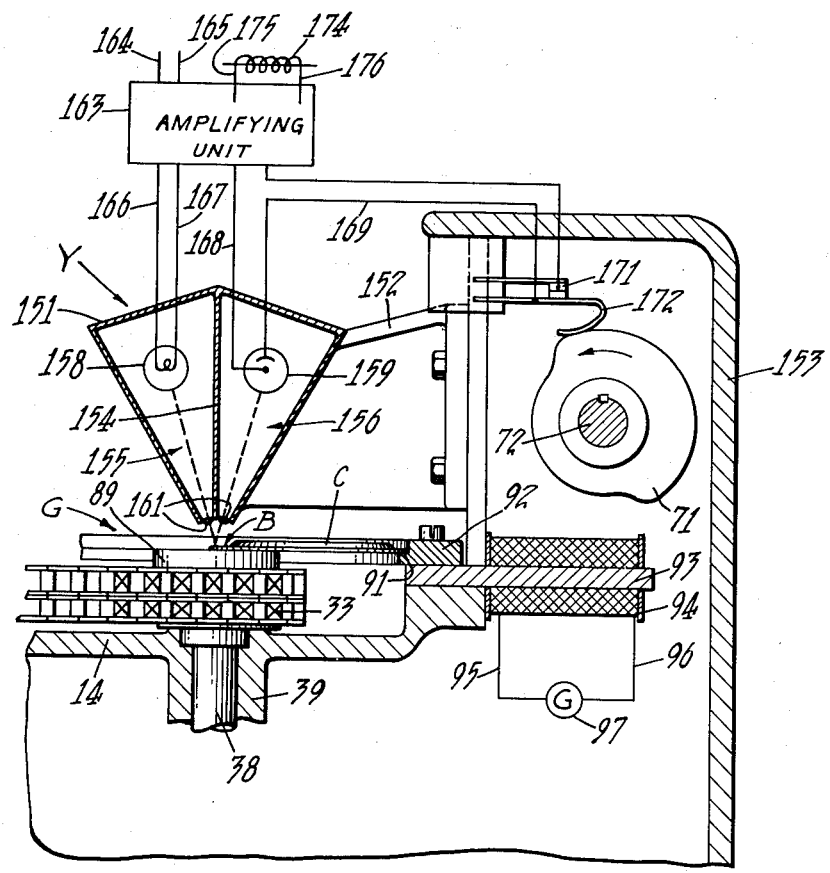

United States Patent Office 2,732,315
Patented Jan. 24, 1956

2,732,315

METHOD OF AND APPARATUS FOR TREATING PREDETERMINED AREAS OF DISC-LIKE ARTICLES

Stellan Birkland, San Francisco, Calif., assignor to American Can Company, New York, N. Y., a corporation of New Jersey Application June 2, 1954, Serial No. 433,969

15 Claims. (Cl. 117—43)

The present invention relates broadly to a method of and apparatus for treating annular areas of disc-like articles, and has particular reference to rotating the articles in a planetary movement during the treatment of the annular areas of the articles.

This is a continuation-in-part of my United States application Serial Number 175,837 filed July 25, 1950, on Method of and Apparatus for Coating Articles Moving With a Planetary Action, now abandoned, and also is a companion to my continuation-in-part United States application Serial Number 433,961 filed June 2, 1954, on Machine for Treating Annular Areas of Magnetizable Circular Articles.

In the instant invention reference to the phrase "treating annular areas of disc-like articles" is intended to cover various treatments such as applying sealing compound or other coatings, scanning or inspecting, heat treating, cooling, drying, etc. annular areas on disc-like articles such as discs, can or container end closure members or covers, annular flanges on circular can bodies, etc.

An object of the invention is the provision of a method of and apparatus for treating annular areas of disc-like articles, wherein the articles are rotated on their own axes and moved bodily along an arcuate path, as in a planetary system, around a fixed point at which is located a treating device, for directing the annular areas of the articles progressively through the fixed point for treatment.

Another object is the provision of such a method and apparatus wherein the articles to be treated are maintained in a single plane and may be rotated through a full 360 degrees for treatment of an entire annular area of an article.

Another object is the provision of such a method and apparatus wherein the articles to be treated may be advanced for treatment in a substantially continuous procession and at exceedingly high speeds.

Another object is the provision of such a method and apparatus which is particularly adapted to various treatments such as applying sealing compound or other coatings, scanning or inspecting, heating, cooling, drying, etc. annular areas on disc-like articles such as discs, can or container end closure members or covers, annular flanges on circular can bodies, etc.

Numerous other objects and advantages of the invention will be apparent as it is better understood from the following description, which, taken in connection with the accompanying drawings, discloses a preferred embodiment thereof.

Referring to the drawings:

Figure 1 is a top plan view of one form of apparatus for carrying out the method steps of the instant invention;

Fig. 2 is a longitudinal section taken through the machine shown in Fig. 1, with parts broken away, the view also showing a wiring diagram of the electric apparatus used in the machine;

Fig. 3 is an enlarged sectional view of a coating device in the form of a nozzle used in one form of the machine;

Fig. 8 is a fragmentary sectional view similar to Fig. 2 showing still another form of apparatus for carrying out the method steps of the instant invention;

Fig. 9 is a fragmentary top plan view similar to Fig. 1 and showing certain of the parts shown in Fig. 8, and Fig. 10 is a fragmentary sectional view similar to Fig. 2 showing still another form of the apparatus for carrying out the method steps of the instant invention.

As a preferred or exemplary embodiment of the instant invention the drawings illustrate the method steps and principal parts of machines for applying or depositing a fluid sealing compound A (Fig. 1) into a curled peripheral flange portion B of a sheet metal end member or cover C for a container or can, as an incident to preparing the cover for assembly with a can or a can body.

In the method aspect of the invention, certain steps are required to apply the fluid coating material or sealing compound A to or to effect other treatment on the articles C. In accordance with these steps, an article is propelled and guided along a predetermined curved or arcuate path of travel and about a fixed point, no radius of curvature of the path being greater than the diameter of an article C. While the article is thus being advanced along this path of travel constituting one movement of the article, it is also rotated on its own axis in time with its advancing movement as in a rolling or planetary movement to present constantly changing peripheral portions B of the article C progressively to the fixed point so that each peripheral portion B traverses a roulette or substantially hypocycloidal path passing at least once through the fixed point. While the article is thus advanced and rotated through the fixed point the coating material is applied or other treatment effected at the fixed point to the article as the latter is progressively presented to the fixed point. These steps of the method may be carried out in the various machines of the drawings and in still other machines.

In the machine illustrated in Figs. 1 to 5 inclusive of the drawings, the can ends C are fed individually from a suitable supply, for example a stack D (Fig. 1) of such can ends and are advanced by a conveyor E along a path of travel which includes a curved portion centered around a fixed point, or center of curvature of the path, such as a stationary lining nozzle F located at a lining or treating station G, no radius of curvature of the curved or arcuate path of travel being greater than the diameter of a can end. As the can ends C travel around this curved portion, they rotate in such a manner that their curled flange is always directly under the fixed point or nozzle F. Hence as the curled flange of a rotating can end advances under the nozzle, the nozzle deposits the sealing compound into the flange progressively until the entire flange has received a film of the compound. This requires one full revolution of the can end which revolution is effected in the travel of the can end around the center of curvature of the curved portion of its path of travel. Thereafter the lined can end is advanced for discharge from the machine, usually into a drier for the drying of the compound to produce a resilient gasket.

Figure 4:
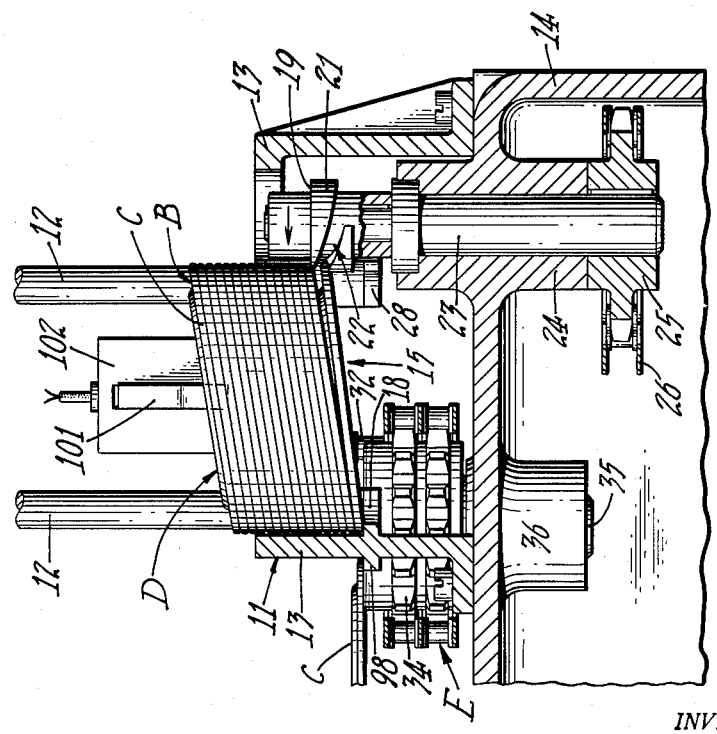
Fig. 4 is an enlarged sectional view taken substantially along the line 4—4 in Fig. 1, with parts broken away.

The stack D of can ends C is carried in a magazine 11 (Figs. 1, 2 and 4) which preferably comprises a plurality of upright retainer bars 12 secured at their lower ends in a magazine bracket 13 fastened to the top of a frame 14 which constitutes the main frame of the machine. The can ends C are fed individually from the bottom of the stack, through an opening 15 formed in the magazine bracket 13. For this purpose one edge of the lowermost can end in the stack rests on a horizontally disposed supporting guide rail 18 (Figs. 1 and 4) which is formed as a part of the magazine bracket 13. An opposite edge of this can end rests on a shoulder or ledge 19 of a conventional separator screw 21 having a helical feed thread 22 open at both ends. The shoulder 19 of the screw is disposed at a level slightly above the guide rail 18 so as to support the can ends C in a slightly inclined position as best shown in Fig. 4.

The separator screw 21 is carried on the upper end of a vertical shaft 23 journaled in a bearing 24 formed in the main frame 14. The shaft is rotated continuously in time with the conveyor E by a sprocket 25 secured to the lower end of the shaft. The sprocket is rotated by an endless chain 26 which is driven by connection with the conveyor E as will be hereinafter more fully explained.

Hence, as the separator screw 21 rotates in a clockwise direction, the edge of the lowermost can end supported by the shoulder 19 of the screw, falls into the helical thread 22 and is carried down to the bottom of the screw where it leaves the thread and drops from the screw onto an adjacent support ledge 28 (Figs. 1 and 4) formed on the magazine bracket 13. This action pivots the can end on its opposite edge supported on the guide rail 18 and leaves the can end in a substantially horizontal position in the path of travel of the conveyor E, with the major portion of the can end separated from the remaining inclined can ends in the stack, for advancement by the conveyor as hereinbefore mentioned. This is a conventional can end separating operation.

The conveyor E preferably is a double chain endless conveyor disposed in a horizontal position with one run located directly under the magazine 11 and the other in spaced and parallel relation beyond the magazine as best shown in Fig. 1. Feed pins or dogs 32 (Figs. 1, 2 and 4) extend up from the conveyor chain at spaced intervals along its length for engaging behind and advancing the can ends C. The conveyor extends longitudinally of the machine and is carried on a driving sprocket 33 and an idler sprocket 34 disposed adjacent the ends of the machine.

The idler sprocket 34 is located at the entrance and discharge end of the machine (at the left as viewed in Figs. 1 and 2) and is carried on a short vertical idler shaft 35 journaled in a bearing 36 formed in the main frame 14. The driving sprocket 33 is located at the lining end of the machine (at the right as viewed in Figs. 1 and 2) and is secured to a vertical sprocket shaft 38 journaled in a bearing 39 formed in the main frame 14. The sprocket shaft 38 is continuously rotated by a bevel gear 41 (Fig. 2) which is carried on the lower end of the shaft and which meshes with a bevel gear 42 keyed to a horizontally disposed main drive shaft 43 journaled in bearings 44 (Fig. 1) formed in the main frame 14. The main drive shaft may be rotated in any suitable manner. It is this drive shaft 43 that actuates the separator screw 21, the chain 26 being driven by a sprocket 46 (Fig. 2) carried on the vertical sprocket shaft 38.

Hence as the main drive shaft 43 rotates, it actuates the conveyor E in a clockwise direction as viewed in Fig. 1 as indicated by the arrows in that figure and thus causes the feed dogs 32 carried thereon to pass under the magazine 11 and engage behind a separated can end C located at the magazine and feed it from the magazine toward the lining nozzle F at the lining station G.

The lining nozzle F as best shown in Fig. 3 comprises an upright tubular body 48 having at its lower end a chamber 49 and a nozzle valve member 51 secured to the end of the nozzle and provided with a discharge orifice 52 which communicates with the chamber. An inlet tube 53 secured to the body 48 and in communication with the chamber 49 leads from any suitable source of fluid lining material under pressure and conveys the lining material into the chamber for controlled discharge through the valve orifice 52. Discharge of the material from the orifice 52 is controlled by a needle valve 55 which normally is disposed in the discharge orifice 52 and thereby maintains this orifice in a closed condition.

The needle valve 55 is formed on the lower end of a valve stem 56 which extends up through the chamber 49 and a slide bearing 57 in the nozzle body 48 and extends beyond the top of the body. At its upper end the nozzle body 48 is provided with a counterbore 58 which houses a compression spring 59 coiled around the valve stem 56. The spring is interposed between a nut 61, threadedly engaged in the upper end of the counterbore, and a collar 62 on the portion of the valve stem 56 located in the counterbore. It is this spring that keeps the needle valve 55 normally in nozzle closing position in the nozzle discharge orifice 52.

This nozzle F is located in the machine in a vertical position directly above the center of the sprocket shaft 38 of the conveyor E as best shown in Figs. 1 and 2, with the nozzle valve 51 close to but in spaced relation to the top end of the shaft. The nozzle is supported on a lifter arm 65 which intermediate its ends is mounted on a short pivot shaft 66 carried in a pair of bearing lugs 67 formed on the machine frame 14. The inner end of the arm 65 is provided with a ring portion 68 which surrounds and supports the nozzle body 48.

The entire nozzle body 48 is lowered and raised while the valve stem 56 is held stationary, to open and close the nozzle discharge orifice 52 to effect a lining operation. For this purpose the outer end of the arm 65 carries a cam roller 69 which operates against an edge cam 71 (Fig. 2) carried on a transverse horizontal cam shaft 72 journaled in bearings 73 in the machine frame 14. The cam shaft is rotated continuously by an endless chain 75 which operates over a sprocket 76 carried on the cam shaft 72 and over a sprocket 77 mounted on the main drive shaft 43 as best shown in Fig. 1. A spring barrel 78 housed in a boss 79 depending from the frame 14 engages against the arm 65 and holds the cam roller 69 against the cam 71.

The nozzle valve stem 56 is held normally stationary by a bell crank 81 (Figs. 1 and 2) which is mounted on a pivot pin 82 carried in a bracket 83 on the machine frame. One leg of the bell crank 81 is provided with a fork 84 which straddles the upper portion of the nozzle valve stem 56 and engages under a pair of adjusting and locking nuts 85 threadedly engaged on the stem.

The nuts 85 are used for adjusting and locking the needle valve 55 in proper position relative to the nozzle orifice 52. The other leg of the bell crank 81 is attached to a movable core element 87 of a normally energized electric solenoid 88 mounted on the frame bracket 83. The solenoid is energized and de-energized in accordance with a sufficient supply of can ends C in the stack D to control the lining operations as will be more fully explained hereinafter.

Hence as each can end C is fed from the magazine 11 and advanced into position under the nozzle F, the cam 71 raises the outer end of the arm 65 and this lowers the nozzle toward the can end to be lined. This lowering of the nozzle withdraws the stationary needle valve 55 from the valve orifice 52 and thus permits the fluid lining material from the nozzle chamber 49 to flow out under pressure of the material onto the can end. The lining material is deposited onto the flange B of the can end as hereinbefore mentioned as the flange is rotated under the nozzle in a manner which progressively positions successive portions of the flange under the nozzle as will now be explained.

Advancement of the can ends C from the magazine 11 to and around the nozzle F at the lining station G is effected by the feed dogs 32 on the conveyor E. As a dog 32 pushes a can end from under the magazine, the inner edge of the can end supported on the guide rail 18, remains on and slides along this rail. An enlarged flat hub 89 on the conveyor sprocket 33 is flush with the guide rail 18 and serves as a continuation of this rail to support the inner edge of the can end as it approaches and remains under the nozzle F.

The opposite edge of the can end C moves away from its supporting ledge 28 and rides onto a support ledge 91 (Figs. 1, 2 and 5) of a horizontally disposed horseshoe shaped guide rail 92 which is supported on the machine frame 14. This rail 92 is magnetized, either by itself being a permanent magnet, or by contact with permanent magnets, or as shown in Fig. 2 of the drawings by contact with a core 93 of an electromagnet 94 energized through wires 95, 96 connecting with a source of electric current such as a generator 97.

This magnetized guide rail 92 surrounds the nozzle valve member 51 in a plane just below the valve member and the curved portion of the rail is concentric with the valve orifice 52. The radius of this curved portion of the rail determines the path of each can end and is such that when the outer edge of a can end supported on the ledge 91 is in engagement with the rail, the center of the can end flange B to receive the lining material is always directly under the nozzle orifice 52.

Thus when a can end C, propelled by a feed dog 32 of the conveyor E is advanced to a position where its outer edge engages and is supported on the ledge 91 of the magnetized guide rail 92, the rail attracts and tends to hold or retard the outer edge of the can end against the inner face of the rail. This tendency of the can end to cling to the rail 92 as the can end is being pushed forward by the feed dog 32, causes the can end to roll along the guide rail and thus rotate on its own axis while it is moving forward with its inner edge supported on the flat hub 89 of the sprocket 33.

Figure 5:
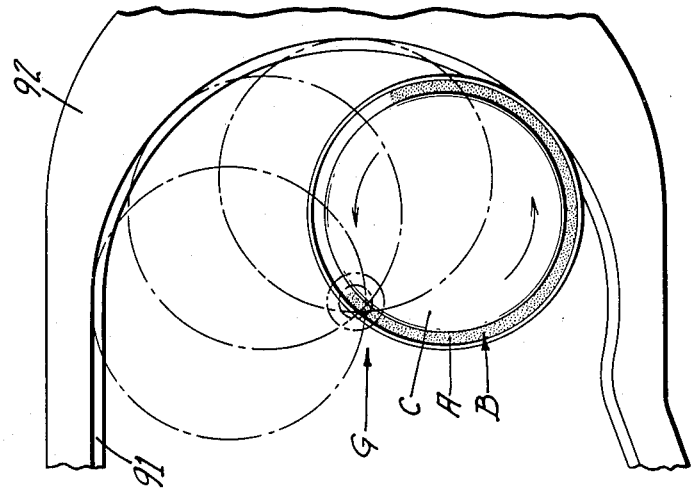
Fig. 5 is an enlarged schematic view illustrating the planetary movement of articles advanced through the machine.

Since the radius of the rail 92 is such as to keep the flange B along the inner edge of the can end, always under and in alignment with the nozzle orifice 52, successive portions of the flange are progressively positioned under the nozzle orifice as the can end rolls along the rail as diagrammatically shown in Fig. 5. It is during this cycle of operation of the machine that the nozzle orifice 52 is open and discharges the lining material onto the flange. The curved portion of the guide rail is long enough to permit the can end to make slightly more than one complete revolution. Hence the lining material is applied to the flange entirely around the can end with a slight overlap at the starting and finishing points to insure complete lining of the can end.

After the lining operation, the conveyor E advances the lined can end along a terminal discharge section 94 of the guide rail 92 which extends outwardly at an angle to and as a continuation of the curved portion of the guide rail. Being an integral part of the guide rail 92, the discharge section 94 is also magnetized and therefore causes the advancing can end to cling to it and roll along its inner face. While the can end rolls along this discharge section 94 with its outer edge supported by the section, the inner edge of the can end rides off of the flat supporting hub 89 of the sprocket 33 and slides back onto the adjacent end of the guide rail 18 to support this inner edge of the can end. The angularly disposed discharge section 94 of the guide rail 92 draws the can end outwardly away from the path of travel of the next following incoming can end to be lined and thus prevents interference of adjacent can ends in the procession. The guide rail 18 is broad enough to permit of this deflection of the lined can end being discharged.

Upon reaching the terminal end of the discharge section 94 of the magnetized guide rail 92, the outer edge of the lined can end leaves the rail 92 and rides onto an unmagnetized support rail 96 having a supporting ledge 97 (Fig. 1). The inner edge of the can end continues to be supported on an outer ledge 98 of the guide rail 18. This ledge 98 is formed on the bracket 13, (see Fig. 4) and the outer face of the bracket serves as a guide for the can end. The can end upon reaching the guide rail 96 stops rolling and thereafter is merely advanced along the rails 96, 98 to any suitable place of deposit, usually into a drier for drying the lining material to convert it into a resilient gasket as hereinbefore mentioned.

Provision is made for keeping the nozzle orifice 52 closed when the supply of can ends C in the magazine 11 runs low to prevent the discharge of the lining material from the nozzle when no can ends are advanced for lining. This control of the nozzle is brought about by a detector finger 101 (Figs. 1 and 2) which engages against the edges of the can ends in the stack D a predetermined distance above the bottom of the magazine. The finger 101 is pivotally connected to a switch box 102 secured to the magazine bracket 13. The free end of the finger engages against a movable element 103 (Fig. 2) of a normally closed electric switch 104 housed in the switch box 102.

The electric switch 104 is part of a relay circuit R (see wiring diagram in Fig. 2) which controls a solenoid circuit S which includes the normally energized solenoid 88. These circuits transmit electric current from any suitable source such as a generator 106. In the relay circuit R, electric current from the generator 106 flows along a wire 107, a connecting wire 108, through the closed switch 104, along a wire 109, through a conventional slow opening time delay relay 111, a wire 112, returning along a connecting wire 113 to the generator 106. In the solenoid circuit S the current from the generator 106 flows along wire 107, a connecting wire 114, through a normally closed relay switch 115 controlled by the relay 111, along a connecting wire 116, through the solenoid 88, returning to the generator along the wire 113. The current passing along this circuit maintains the solenoid 88 in an energized condition.

When lack of replenishment of the can ends C in the stack D permits the can ends to reach a level below the detector finger 101, the finger, under resistance of a spring in the switch box 102, moves away from the movable element 103 of the switch 104 and thereby permits the switch to open. This opening of the switch 104 breaks the relay circuit R and thus sets the time delay relay 111 in operation. This relay is a conventional quick closing slow opening time delay relay of which many types of commercially produced, and is set to permit all of the can ends remaining in the magazine 11 below the finger 101, to be advanced and lined before the relay acts. When ready to act, the relay 111 opens the switch 115 in the solenoid circuit S and thus breaks this circuit. Breaking of this circuit de-energizes the solenoid 88.

De-energizing of the solenoid 88, releases the bell crank 81 which normally supports the valve stem 56 of the nozzle F and thus permits the valve stem to move up and down with the nozzle body 48 as the nozzle F is lowered toward a can end for a lining operation and is raised again at the completion of the operation. Thus with the valve stem 56 free to move with the nozzle body, the needle valve 55 at the lower end of the stem remains seated in the nozzle orifice 52 and thereby keeps the orifice closed against discharge of the lining material therefrom.

Replenishment of the can ends in the magazine 11 forces the detector finger 101 back into its original position and closes the switch 104 and this re-establishes the relay circuit R. This excites the time delay relay 111 to immediately close the switch 115 in the solenoid circuit S and thereby permits re-establishment of this circuit and a re-energizing of the solenoid 88 which raises the bell crank 81 to again support the nozzle valve stem 56 and return the nozzle to normal operating condition as explained above.

Figure 6:
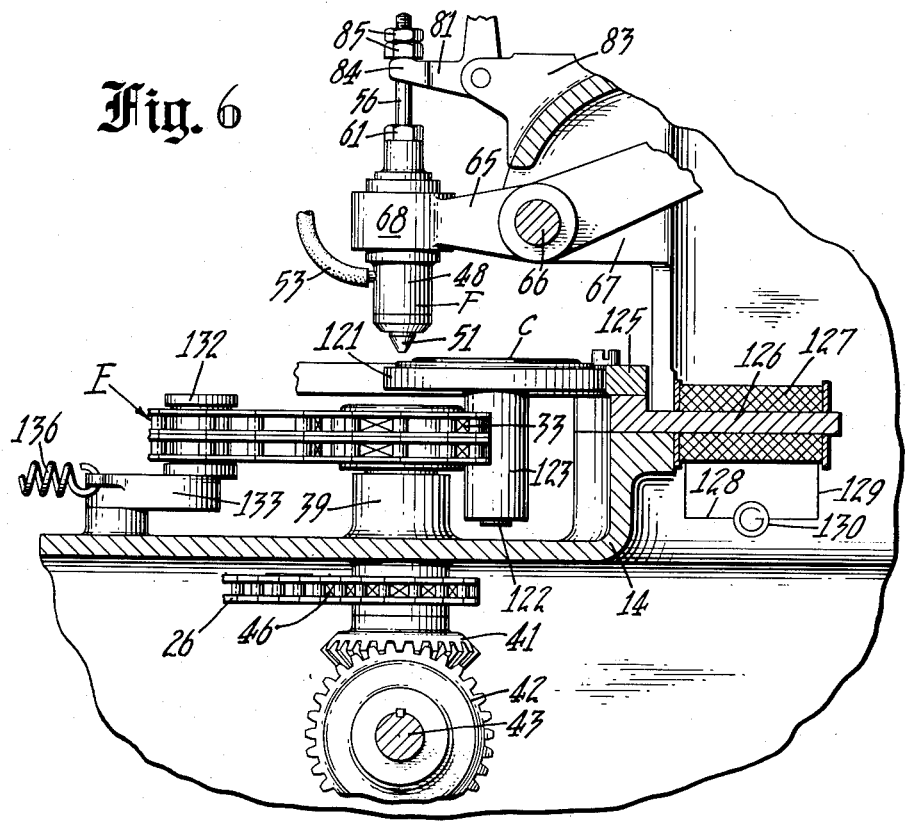
Fig. 6 is a fragmentary sectional view similar to Fig. 2 showing another form of apparatus for carrying out the method steps of the instant invention.
Figure 7:
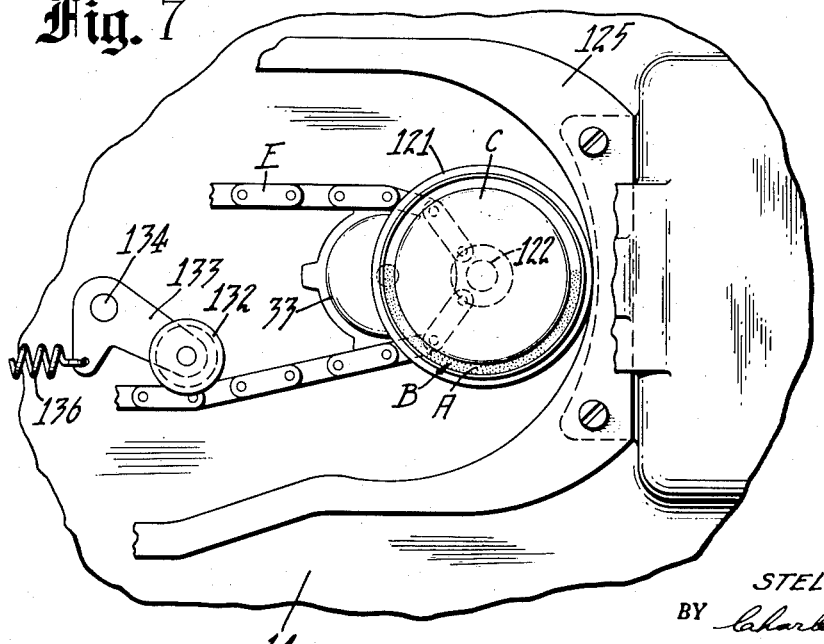
Fig. 7 is a fragmentary top plan view similar to Fig. 1 and showing certain of the parts shown in Fig. 6.

In another form of machine, fragmentally illustrated in Figs. 6 and 7 of the drawings, the covers C are supported on rotatable tables, or discs 121 having cover supporting means and depending shafts 122 disposed in bearings 123 carried by the conveyor E. The outer edge of the disc or support engages against a rotating or guide rail 125 similar to the rail 92 shown in Fig. 3. If desired frictional engagement between the supports 121 and the rail 125 may be utilized to rotate the supports as they ride along the rail. However as shown in the drawings, the rail 125 preferably is magnetized, either by itself being a permanent magnet or by contact with permanent magnets, or as shown in the drawings by contact with a core 126 of an electromagnet 127 energized through wires 128, 129 connecting with a source of electric current such as a generator 130 as shown in Fig. 3. In such a construction the table or disc 121 or a part thereof is made of magnetizable material.

In either case of a magnetized or nonmagnetized rail 125, the supports 121 roll along the rail as the supports are advanced by the conveyor E around the nozzle F and thus the covers C receive a film of the coating material progressively as in the case of the machine illustrated in Figs. 1 to 5 inclusive. The only difference is that in one case the cover contacts and rolls along the rail 125 and in the other case the support 121 rolls along the rail. In some cases it may not be practical to provide rolling contact between the support and the rail but may be practical to provide such contact between a collar on the support shaft and the rail.

In this form of machine, an idler roller 132 mounted on an arm 133 carried on a pivot shaft 134 secured in the machine frame, is provided to force the conveyor E outwardly along the discharge portion of the rail 125, to provide for clearance between the supports 121 as they move into and out of the lining station G. A tension spring 136 connected to the arm 133 holds the idler roller 132 and the conveyor E in proper position and provides for yieldable action between the supports 121 and the rail 125.

In still another form of machine, fragmentally illustrated in Figs. 8 and 9 of the drawings, the supports 121 or a collar on the support shafts 122 are provided with gear teeth 138 which mesh with rack teeth 139 formed on the inner face of the guide rail 125. In such a construction the supports 121 and the covers C carried thereon are rotated by the meshing teeth 138, 139 as the conveyor E advances the supports along their path of travel around the nozzle F as described above in connection with the other two forms of machines. The rail 125 may or may not be magnetized as desired. As in the second form of machine, illustrated in Figs. 6 and 7, the idler roller 132 is provided to force the conveyor E outwardly along the discharge end of the rail 125 to prevent interference of the supports 121 moving into and out of the lining station G.

Where a treatment other than applying a coating material is to be effected on the disc-like articles as they progressively pass through the treating station G, the stationary lining nozzle F at the fixed point of the treating station is replaced by an appropriate treating device. For example Fig. 10 illustrates the machine equipped with a scanning device Y for scanning or inspecting at the fixed point of the treating station G, the annular areas of the disc-like articles for imperfections as the articles progressively pass through the treating station.

The scanning device Y preferably comprises a stationary housing 151 located above the fixed point at the treating station G and held in place by an integral bracket 152 secured to an upright casing 153 which extends up from the machine frame 14 and which encases the edge cam 71. The housing 151 is formed with a vertical, centrally located partition 154 which divides the housing into two adjacent compartments 155, 156 which are entirely closed except at their bottom ends. The compartment 155 houses a source of light 158 and the compartment 156 houses a photoelectric cell or electric eye 159. The bottom ends of the housing carry lenses 161 which are arranged to focus a beam of light from the light source 158 onto the fixed point at the treating station G for reflection to the photoelectric cell 159 when an imperfection is detected in the annular area of a disc-like article progressively passed through the treating station.

A conventional amplifying unit 163 is used to amplify the electric current impulses from the photoelectric cell 159 to visibly signal or to electrically operate a reject mechanism or other suitable device when an article with imperfections is detected. The amplifying unit 163 receives electric current from any suitable source, by way of lead lines 164, 165 which connect with the unit. To provide a compact unit the source of light 158 is connected through the unit by wires 166, 167 to the lead wires 164, 165. The photoelectric cell 159 is connected to the unit by a wire 168 and by a wire 169 which includes a normally open electric switch 171 having a movable element 172 which rides on the outer periphery of the edge cam 71 on the cam shaft 72 for the purpose of closing the switch 171 and thus connecting the photoelectric cell to the unit in time with the passage of the articles through the treating station. Provision is also made for operating a reject mechanism or other device if such is desirable. For this purpose a solenoid relay 174 is connected into the unit by way of wires 175, 176.

Thus it will be seen that various constructions of machines may be devised for effecting the important feature of advancing an article rotating on its own axis as in a planetary movement to progressively present successive portions of the article to a stationary treating device at a fixed point for a desired treatment.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

1. A method of treating a predetermined area of a disc-like article, which method comprises advancing an article in a predetermined arcuate path bodily around a fixed point at the center of curvature of said path, no radius of curvature of said path being greater than the diameter of said article, simultaneously rotating the advancing article on its own axis, said advancement along said predetermined path directing said predetermined area of the article progressively through said fixed point, whereby the entire predetermined area of said advancing and rotating article is passed through said fixed point, and treating at said fixed point the predetermined area of said advancing and rotating article as said area progressively passes through said fixed point.

2. In a machine for treating a predetermined area of a disc-like article, the combination of means for advancing an article in an arcuate path around a fixed point at the center of curvature of said path, no radius of curvature of said path being greater than the diameter of said article, means for simultaneously rotating said advancing article on its own axis for directing said entire predetermined area progressively through said fixed point, and treating means in alignment with said fixed point for treating at said fixed point the predetermined area of said advancing and rotating article as said area progressively passes through said fixed point.

3. In a machine for treating a predetermined area of a disc-like article, the combination of a conveyor for propelling an article in a circular path around a fixed center of curvature, the radius of curvature of said path being not greater than the diameter of said article, means for simultaneously rotating said advancing article on its own axis to pass said entire predetermined area progressively through said fixed center, and treating means disposed in alignment with said fixed center of curvature for treating at said fixed center the entire predetermined area of the advancing and rotating article as progressive portions of said area are thus passed in a hypocycloidal path through said fixed center.

4. A method of applying fluid coating material to a predetermined area of a disc-like article, which method comprises advancing an article in a predetermined arcuate path bodily around a fixed point at the center of curvature of said path, no radius of curvature of said path being greater than the diameter of said article, simultaneously rotating the advancing article on its own axis, said advancement along said predetermined path directing said predetermined area of the article progressively through said fixed point, whereby the entire predetermined area of said advancing and rotating article is passed through said fixed point, and applying coating material at said fixed point to the predetermined area of said advancing and rotating article as said area progressively passes through said fixed point.

5. A method of applying fluid coating material to an annular area of disc-like articles, which method comprises bodily advancing and guiding an article along a circular path of travel around a fixed center, the radius of said path being not greater than the diameter of said article, rotating the article on its own axis as it is advanced along said circular path of travel in time with the bodily advancement of the article, said advancement along said predetermined circular path directing said annular area for its entire annular extent at least once through said fixed center, and applying coating material at said fixed center to the annular area of said advancing and rotating article as said area passes progressively through said fixed center.

6. In a machine for applying fluid coating material to a predetermined area of a disc-like article, the combination of means for advancing an article in an arcuate path around a fixed point at the center of curvature of said path, no radius of curvature of said path being greater than the diameter of said article, means for simultaneously guiding and rotating said advancing article on its own axis for directing said entire predetermined area progressively through said fixed point, and a nozzle disposed in alignment with said fixed point for applying a fluid coating material at said fixed point to the predetermined area of said advancing and rotating article as said area progressively passes through said fixed point.

7. In a machine for applying fluid coating material to a predetermined area of a disc-like article, the combination of means for advancing an article in a circular path around a fixed center of curvature, the radius of curvature of said path being not greater than the diameter of said article, means for simultaneously rotating said advancing article on its own axis to pass said entire predetermined area progressively through said fixed center, and a nozzle disposed in axial alignment with said fixed center of curvature for applying a fluid coating material at said fixed center to said entire predetermined area of the advancing and rotating article as said area progressively passes through said fixed center.

8. In a machine for applying fluid coating material to a predetermined area of a disc-like article, the combination of a conveyor for propelling an article in a circular path around a fixed center of curvature, the radius of curvature of said path being not greater than the diameter of said article, means for simultaneously rotating said advancing article on its own axis to pass said entire predetermined area progressively through said fixed center, and a nozzle disposed in alignment with said fixed center of curvature for applying a fluid coating material at said fixed center to said entire predetermined area of the advancing and rotating article as progressive portions of said area are thus passed in a hypocycloidal path through said fixed center.

9. In a machine for applying fluid coating material to a predetermined area of a disc-like article, the combination of a conveyor, a circular support rotatably mounted on said conveyor for supporting an article, means for moving said conveyor and said supported article along a circular path around a fixed center of curvature, the radius of curvature of said path being not greater than the diameter of said article, a stationary member disposed adjacent the path of said rotatable support, said stationary member having a surface conforming generally to the path of said conveyor for engaging a peripheral portion of said advancing rotatable support whereby the support is rolled along said surface and the supported article is rotated on its axis as it advances with the conveyor, and a nozzle disposed in alignment with said fixed center of curvature for applying a fluid coating material at said fixed center to the entire predetermined area of the advancing and rotating article as progressive portions of said area are thus passed in a hypocycloidal path through said fixed center.

10. In a machine for applying fluid coating material to a predetermined area of a disc-like article, the combination of a conveyor, a support rotatably mounted on said conveyor for supporting a said article, gear teeth formed in the periphery of said support, means for moving said conveyor and said supported article along a circular path around a fixed center of curvature, the radius of curvature of said path being not greater than the diameter of said article, a stationary curved rack disposed adjacent the path of said rotatable support, said stationary curved rack conforming generally to the path of said conveyor and being in mesh with said gear teeth on the advancing rotatable support whereby the support and the supported article are rotated as they advance with the conveyor, and a nozzle disposed in axial alignment with said center of curvature for applying a fluid coating material at said fixed center to the entire predetermined area of the advancing and rotating article as progressive portions of said area are thus passed in a hypocycloidal path through said fixed center.

11. In a machine for applying fluid coating material to a predetermined area of a disc-like article, the combination of feeding devices for supporting a said article and for advancing it in a circular path around a fixed center of curvature, the radius of curvature of said path being not greater than the diameter of said article, means for rotating said supported article on its own axis as the article is advanced to pass said entire predetermined area progressively through said fixed center, and a nozzle having an orifice disposed at said fixed center of curvature, a stationary valve stem extending into said nozzle orifice, and means for reciprocating said nozzle relative to said stationary stem in timed relation with the movements of said feeding devices and article rotating means to open said orifice and thus effect application of a fluid coating material at said fixed center to said entire predetermined area of the advancing and rotating article as progressive portions of said area are thus passed in a hypocycloidal path through said fixed center.

12. In a machine for applying fluid coating material to articles, the combination of a magazine for a stack of articles, conveyor means for receiving articles from said magazine and for propelling them along a path of travel, a nozzle disposed adjacent said path of travel, said nozzle having an orifice for discharging fluid coating material onto the articles propelled by said conveyor means, a normally stationary valve stem extending through said nozzle and into said orifice, actuating means connecting with said nozzle and operable in time with said conveyor means for moving said nozzle relative to said valve stem to open and close said nozzle orifice, electric means connecting with said stem for holding it normally stationary, and an electric detector including a time delay device disposed adjacent said magazine and operable by the articles in said magazine when insufficient articles are disposed therein for actuating said electric holding means after a time delay to release said stem for movement with said nozzle to keep said orifice closed until replenishment of articles in said magazine.

13. A method of scanning a predetermined area of a disc-like article, which method comprises advancing an article in a predetermined arcuate path bodily around a fixed point at the center of curvature of said path, no radius of curvature of said path being greater than the diameter of said article, simultaneously rotating the advancing article on its own axis, said advancement along said predetermined path directing said predetermined area of the article progressively through said fixed point, whereby the entire predetermined area of said advancing and rotating article is passed through said fixed point, and scanning at said fixed point the predetermined area of said advancing and rotating article as said area progressively passes through said fixed point for detecting irregularities in said predetermined area.

14. In a machine for scanning a predetermined area of a disc-like article, the combination of means for advancing an article in an arcuate path around a fixed point at the center of curvature of said path, no radius of curvature of said path being greater than the diameter of said article, means for simultaneously rotating said advancing article on its own axis for directing said entire predetermined area progressively through said fixed point, and a photoelectric cell disposed in alignment with said fixed point for detecting at said fixed point imperfections in the predetermined area of said advancing and rotating article as said area progressively passes through said fixed point.

15. In a machine for scanning a predetermined area of a disc-like article, the combination of a conveyor for propelling an article in a circular path around a fixed center of curvature, the radius of curvature of said path being not greater than the diameter of said article, means for simultaneously rotating said advancing article on its own axis to pass said entire predetermined area progressively through said fixed center, and scanning means disposed in alignment with said fixed center of curvature for detecting at said fixed center imperfections in the predetermined area of the advancing and rotating article as progressive portions of said area are thus passed in a hypocycloidal path through said fixed center.

References Cited in the file of this patent

UNITED STATES PATENTS

| | | |
|---|---|---|
| 1,198,020 | Graham | Sept. 12, 1916 |
| 2,484,830 | Huntar | Oct. 18, 1949 |
| 2,516,908 | Pottle | Aug. 1, 1950 |